United States Patent
Belenko (10) Patent No.: US 11,720,718 B2
(45) Date of Patent: Aug. 8, 2023

(54) SECURITY CERTIFICATE IDENTITY ANALYSIS

(71) Applicant: MICROSOFT TECHNOLOGY LICENSING, LLC, Redmond, WA (US)

(72) Inventor: Andrey V. Belenko, Prague (CZ)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 791 days.

(21) Appl. No.: 16/527,614

(22) Filed: Jul. 31, 2019

(65) Prior Publication Data

US 2021/0037006 A1 Feb. 4, 2021

(51) Int. Cl.
G06F 21/84 (2013.01)
G06F 16/955 (2019.01)
H04L 9/40 (2022.01)

(52) U.S. Cl.
CPC ............ G06F 21/84 (2013.01); G06F 16/955 (2019.01); H04L 63/0823 (2013.01)

(58) Field of Classification Search
CPC ............. H04L 63/0823; H04L 63/1483; G06F 16/955; G06F 21/563; G06F 21/84; G06V 10/10; G06V 30/10
See application file for complete search history.

(56) References Cited

U.S. PATENT DOCUMENTS

| | | | |
|---|---|---|---|
| 7,555,523 B1 | 6/2009 | Hartmann | |
| 7,809,795 B1 | 10/2010 | Cooley et al. | |
| 7,912,907 B1 | 3/2011 | Mantel et al. | |
| 8,225,413 B1 | 7/2012 | De et al. | |
| 8,515,894 B2 | 8/2013 | Yu | |
| 8,635,666 B2 | 1/2014 | Curnyn | |
| 8,725,509 B1 | 5/2014 | Harb et al. | |
| 8,918,466 B2 | 12/2014 | Yu | |
| 9,130,778 B2 | 9/2015 | Dichiu et al. | |
| 9,178,901 B2 | 11/2015 | Xue et al. | |
| 9,594,747 B2 | 3/2017 | Kim et al. | |
| 9,646,061 B2 | 5/2017 | Agarwal et al. | |

(Continued)

OTHER PUBLICATIONS

"International Search Report and Written Opinion Issued in PCT Application No. PCT/US20/036220", dated Sep. 7, 2020, 14 Pages.

(Continued)

*Primary Examiner* — Harunur Rashid
(74) *Attorney, Agent, or Firm* — Shook, Hardy & Bacon, LLP (57) ABSTRACT

The technology described herein uses data in certificate transparency (CT) logs to identify security certificates that are likely to be used for phishing or brand violation. The technology described uses machine vision technology to analyze the domain name in a CT log as a user would view it. The domain name in the CT log is rendered as it might appear in a web browser's address bar. The rendered domain name is then converted to a text string using optical character recognition (OCR). The text string generated by OCR is then analyzed by a brand detection system to determine whether the text string matches a brand name. When a known brand is detected, a trust analysis is performed to determine whether the security certificate in the CT log is actually associated with the brand.

20 Claims, 6 Drawing Sheets

(56) References Cited

U.S. PATENT DOCUMENTS

| | | | |
|---|---|---|---|
| 9,847,973 | B1 | 12/2017 | Jakobsson et al. |
| 10,116,678 | B2 | 10/2018 | Larosa et al. |
| 10,127,388 | B1* | 11/2018 | Popuveniuc .......... G06F 21/64 |
| 10,412,108 | B2 | 9/2019 | Larosa et al. |
| 10,673,814 | B1 | 6/2020 | Huffner et al. |
| 2006/0047760 | A1 | 3/2006 | Encinas et al. |
| 2006/0149820 | A1 | 7/2006 | Rajan et al. |
| 2009/0169019 | A1* | 7/2009 | Bauchot ............... H04L 9/3247 380/278 |
| 2010/0106677 | A1 | 4/2010 | Yu |
| 2014/0067374 | A1 | 3/2014 | Wilkins et al. |
| 2014/0074860 | A1 | 3/2014 | Medelyan |
| 2014/0074886 | A1 | 3/2014 | Medelyan et al. |
| 2014/0095866 | A1* | 4/2014 | Grebennikov ........ H04L 9/3268 713/156 |
| 2016/0217186 | A1 | 7/2016 | Agarwal et al. |
| 2016/0277193 | A1* | 9/2016 | Sabin ..................... H04L 9/321 |
| 2016/0285856 | A1* | 9/2016 | Johansson .......... H04L 63/0823 |
| 2016/0344770 | A1 | 11/2016 | Verma et al. |
| 2017/0242932 | A1 | 8/2017 | Aravkin et al. |
| 2018/0027013 | A1 | 1/2018 | Wright et al. |
| 2018/0091453 | A1 | 3/2018 | Jakobsson |
| 2018/0191754 | A1 | 7/2018 | Higbee et al. |
| 2018/0337947 | A1 | 11/2018 | Schiffman |
| 2020/0053119 | A1* | 2/2020 | Schnieders .......... G06K 9/6215 |
| 2020/0067861 | A1 | 2/2020 | Leddy et al. |
| 2020/0099718 | A1 | 3/2020 | Li |
| 2021/0037006 | A1* | 2/2021 | Belenko ............. H04L 63/1483 |
| 2022/0245223 | A1* | 8/2022 | Castelão Soares ......................... H04L 63/1483 |

OTHER PUBLICATIONS

Tian, et al., "Needle in a Haystack: Tracking Down Elite Phishing Domains in the Wild", In Proceedings of the Internet Measurement Conference, Oct. 31, 2018, pp. 429-442.

Krammer, Viktor, "Phishing Defense Against IDN Address Spoofing Attacks", In Proceedings of the International Conference on Privacy, Security and Trust, Oct. 30, 2006, pp. 1-9.

"Non Final Office Action Issued in U.S. Appl. No. 16/201,860", dated Apr. 29, 2021, 60 Pages.

"Final Office Action Issued in U.S. Appl. No. 16/201,860", dated Dec. 27, 2021, 64 Pages.

"Better Uptime and Security With Cert Spotter", Retrieved from: https://sslmate.com/certspotter/, May 17, 2019, 2 Pages.

"Certstreamcatcher", Retrieved from: https://github.com/6IX7ine/certstreamcatcher, May 22, 2019, 2 Pages.

"IDN Homograph Attack", Retrieved from: https://en.wikipedia.org/wiki/IDN_homograph_attack, Apr. 7, 2005, 2 Pages.

Ardi, et al., "AuntieTuna: Personalized Content-based Phishing Detection", In Proceedings of NDSS Workshop on Usable Security, Feb. 21, 2016, 7 Pages.

Cardwell, Mike, "Detecting Phishing Sites Using Certificate Transparency Monitoring", Retrieved from: https://www.hardenize.com/blog/certificate-transparency-monitoring-phishing-detection, Jan. 22, 2019, 4 Pages.

Dunlop, et al., "GoldPhish: Using Images for Content-Based Phishing Analysis", In Fifth International Conference on Internet Monitoring and Protection, May 9, 2010, pp. 123-128.

Finlayson, et al., "Detecting Phishing With Computer Vision: Part 2, SpeedGrapher", Retrieved from: https://www.endgame.com/blog/technical-blog/detecting-phishing-computer-vision-part-2-speedgrapher, Aug. 23, 2018, 24 Pages.

Fu, et al., "Detecting Phishing Web Pages with Visual Similarity Assessment Based on Earth Mover's Distance (EMD)", In Journal of IEEE Transactions on Dependable and Secure Computing, vol. 3, Issue 4, Oct. 2006, pp. 301-311.

Fu, et al., "EMD based Visual Similarity for Detection of Phishing Webpages", In Proceedings of International Workshop on Web Document Analysis, Jan. 2005, 4 Pages.

Grant, Daniel, "Detecting Phishing With Computer Vision: Part 1, Blazar", Retrieved from: https://www.endgame.com/blog/technical-blog/detecting-phishing-computer-vision-part-1-blazar, Aug. 21, 2018, 15 Pages.

Hallam-Baker, et al., "DNS Certification Authority Authorization (CAA) Resource Record", In Internet Engineering Task Force, RFC: 6844, Jan. 2013, 18 Pages.

Huang, et al., "Detecting Phishing Domains Using Certificate Transparency", Retrieved from: https://www.facebook.com/notes/protect-the-graph/detecting-phishing-domains-using-certificate-transparency/2037453483161459/, May 2, 2018, pp. 1-4.

Jain, et al., "Phishing Detection: Analysis of Visual Similarity Based Approaches", In Proceedings of Security and Communication Networks, Article 5421046, Jan. 10, 2017, 21 Pages.

Kleewein, Jim, "Protecting Email Data and Services", Retrieved from: https://techcommunity.microsoft.com/t5/Security-Privacy-and-Compliance/Protecting-email-Data-and-Services/ba-p/169415, Mar. 8, 2018, 5 Pages.

Larsen, Chris, "Bad Guys Using Internationalized Domain Names (IDNs)", Retrieved from: https://www.symantec.com/connect/blogs/bad-guys-using-internationalized-domain-names-idns, May 22, 2014, 16 Pages.

Liu, et al., "An Antiphishing Strategy Based on Visual Similarity Assessment", In Journal of IEEE Internet Computing, vol. 10, Issue 2, Mar. 2006, pp. 58-65.

Mao, et al., "Phishing Page Detection via Learning Classifiers from Page Layout Feature", In Proceedings of EURASIP Journal on Wireless Communications and Networking, Feb. 20, 2019, 14 Pages.

Wang, et al., "Trie-Join: Efficient Trie-based String Similarity Joins with Edit-Distance Constraints", In Proceedings of the VLDB Endowment, vol. 3, Issue 1, Sep. 2010, pp. 1219-1230.

"International Search Report and Written Opinion Issued in PCT Application No. PCT/US19/039118", dated Aug. 14, 2019, 11 Pages.

"Non Final Office Action Issued in U.S. Appl. No. 16/201,860", dated Jul. 7, 2022, 42 Pages.

"Office Action Issued in Indian Patent Application No. 202147010613", dated Nov. 21, 2022, 6 Pages.

"Notice of Allowance Issued in U.S. Appl. No. 16/201,860", dated Dec. 21, 2022, 15 Pages.

* cited by examiner

SECURITY CERTIFICATE IDENTITY ANALYSIS

CROSS REFERENCE TO RELATED APPLICATIONS

Background

Generally, security policies can be used by web services and client devices to authenticate each other. For example, a web service can follow a procedure to authenticate a client before granting access to particular resources. Similarly, the client can authenticate the web service prior to accessing the web service. These authentication processes can use security certificates issued by a public certificate authority (CA). Some authentication processes check a certificate transparency (CT) log to confirm that a certificate being evaluated is in the CT log. Parties running phishing websites will try to get certificates issued for their phishing sites and a record of these certificates can be made in the CT log.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein use data in certificate transparency (CT) logs to identify security certificates that are likely to be used for phishing or brand violation. Machine learning can be used to identify domain names in the CT logs that are visually similar to a brand name or to the name of the legitimate website, and yet, not actually associated with the brand. Many domain names are written in Unicode. Unicode has many advantages, but a downside is the many ways it allows letters to be spoofed. A common example is that an "r and n" can be made to look like an "m." A computer reading the Unicode characters will register the r and n separately, but a person viewing the rendered "r and n" may see an "m." Programs auditing the CT logs can account for some of these spoofing methods, but the almost endless possibilities make accounting for all possible spoofing combinations very difficult.

The technology described herein overcomes this problem by using machine vision technology to analyze the domain name in a CT log as a user would view it. The domain name in the CT log is rendered as it might appear in a web browser's address bar. This is achieved by rendering the domain name in a font and font size used by a browser. In one aspect, the rendering is repeated in all fonts and font sizes known to be used by web browsers.

The rendered domain name is then converted to a text string using optical character recognition (OCR). In one aspect, the OCR system is trained using data rendered in all of the fonts in which the domain name is rendered. The font used to render the domain name may be passed to the OCR system when rendering so that an optimal character recognition may be performed. The text string generated by the OCR system should reflect how a person would read the rendered domain name.

The text string generated by OCR is then analyzed by a brand detection system to determine whether the text string matches a brand name. When a known brand is detected, a trust analysis is performed to determine whether the security certificate in the CT log is actually associated with the brand. The trust analysis can look at several factors including whether the CA issuing the certificate has previously issued certificates for the brand. If the CA issuing the certificate has not previously issued a certificate for the brand then the certificate being evaluated may be designated as un-trustworthy. The trust analysis can also look at lists of CAs authorized by the brand to issue certificates. If the CA issuing the certificate is not on the list, then the certificate may be designated as untrustworthy.

BRIEF DESCRIPTION OF THE DRAWINGS

Aspects of the invention are described in detail below with reference to the attached drawing figures, wherein.

DETAILED DESCRIPTION

The subject matter of aspects of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of this disclosure provide an efficient approach to detect a type of impersonation that includes, for example, brand impersonation or impersonation of a person or an institution within a security certificate. Although the impersonated texts (e.g., domain name) may visually resemble the legitimate text as if it were from the legitimate person, institution, or brand, the disclosed technology can still differentiate the impersonated texts from the legitimate text. In various embodiments, the disclosed technology can detect impersonated texts, such as those created by using Unicode characters that appear visually similar to the original characters but may be in different language scripts. An impersonator may add, delete, or swap characters from the legitimate entity with Unicode characters. Additionally, the impersonated text may be a stand-alone word or may be prefixed, suffixed, or embedded in a string of text in combination with additional characters. Nonconventional symbols or separators can also be used in the impersonated text to evade those anti-phishing techniques that are based on conventional separators. Each of these techniques may be used by impersonators for impersonation with text strings, URLs, email addresses, attachments, documents, etc. Impersonators try to get CAs to issue certificates that include imitated domain names that match the imitative domain name on a phishing website.

Aspects of the technology described herein use data in certificate transparency (CT) logs to identify security certificates that are likely to be used for phishing or brand violation. Machine learning can be used to identify domain names in the CT logs that are visually similar to a brand name or to the name of the legitimate website, and yet, not actually associated with the brand. Many domain names are written in Unicode. Unicode has many advantages, but a downside is the many ways it allows letters to be spoofed. A common example is that an "r and n" can be made to look like an "m." A computer reading the Unicode characters will register the r and n separately, but a person viewing the rendered "r and n" may see an "m." Programs auditing the CT logs can account for some of these spoofing methods, but the almost endless possibilities make accounting for all possible spoofing combinations very difficult.

The technology described herein overcomes this problem by using machine vision technology to analyze the domain name in a CT log as a user would view it. The domain name in the CT log is rendered as it might appear in a web browser's address bar. This is achieved by rendering the domain name in a font and font size used by a browser. In one aspect, the rendering is repeated in all fonts and font sizes known to be used by web browsers.

The rendered domain name is then converted to a text string using optical character recognition (OCR). In one aspect, the OCR system is trained using data rendered in all of the fonts in which the domain name is rendered. The font used to render the domain name may be passed to the OCR system when rendering so that an optimal character recognition may be performed. The text string generated by the OCR system should reflect how a person would read the rendered domain name.

The text string generated by OCR is then analyzed by a brand detection system to determine whether the text string matches a brand name. When a known brand is detected, a trust analysis is performed to determine whether the security certificate in the CT log is actually associated with the brand. The trust analysis can look at several factors including whether the CA issuing the certificate has previously issued certificates for the brand. If the CA issuing the certificate has not previously issued a certificate for the brand then the certificate being evaluated may be designated as un-trustworthy. The trust analysis can also look at lists of CAs authorized by the brand to issue certificates. If the CA issuing the certificate is not on the list, then the certificate may be designated as untrustworthy.

Various actions can be taken when the certificate is deemed untrustworthy. In one aspect, a brand representative is notified. In another aspect, the entity associated with the CA that issued the certificate is notified. The CA may then revoke the certificate. In another aspect, the certificate is added to a list accessible to web browsers. If on the list, the browser may deny access to the web site providing the certificate or alert the user. The browser's response can depend on user settings.

In one aspect, the technology can analyze all certificates in various CT logs. The analysis can be repeated as the CT log changes, most commonly with the addition of new certificate records.

Definitions

Certificate Authority: A certificate authority or certification authority (CA) is an entity that issues digital security certificates, such as an SSL certificate. A digital certificate certifies the ownership of a public key by the named subject of the certificate.

DNS name: A fully qualified domain name (FQDN).

Domain naming service name: The fully qualified domain name (FQDN) as known by the Domain Name System (DNS).

Signature: A value computed with a cryptographic algorithm and bound to data in such a way that intended recipients of the data can use the signature to verify that the data has not been altered and/or has originated from the signer of the message, providing message integrity and authentication. The signature can be computed and verified either with symmetric key algorithms, where the same key is used for signing and verifying, or with asymmetric key algorithms, where different keys are used for signing and verifying (a private and public key pair are used).

Security Certificates: Security certificates have the primary task of authenticating one party to another party (e.g., a server to a client, an email sender to an email recipient).

Security token: A collection of one or more claims. Specifically in the case of mobile devices, a security token represents a previously authenticated user.

Trust: The characteristic that one entity is willing to rely on a second entity to execute a set of actions and/or to make a set of assertions about a set of subjects and/or scopes.

User: A person who employs a web browser requestor or other client application to access a web service (WS) resource.

Web browser requestor: An HTTP web browser client that transmits protocol messages between an IP/STS (or other entity) and a relying party.

Web service (WS) resource: A destination HTTP web application or an HTTP resource serviced by the application. The WS refers to the application or manager of the resource that receives identity information and assertions issued by an IP/STS. The WS resource is a relying party.

Having briefly described an overview of aspects of the technology described herein, an exemplary operating environment in which aspects of the technology described herein may be implemented is described below.

Example Security Certificate Environment

Figure 1:
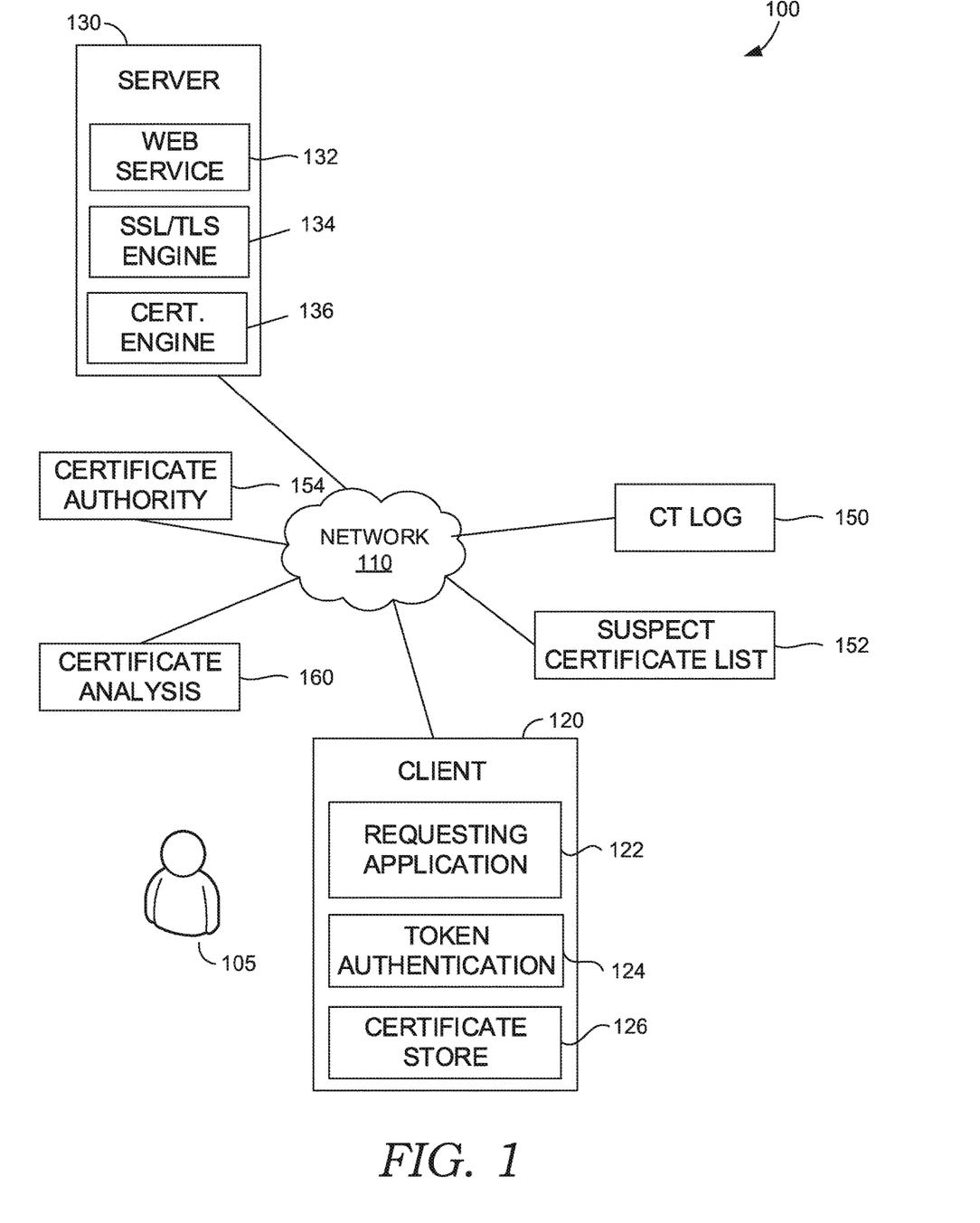
FIG. 1 is a block diagram of an example operating environment suitable for implementing aspects of the technology.

Turning now to FIG. 1, an exemplary security certificate environment 100 is shown, according to an aspect of the technology described herein. Environment 100 illustrates both the use of security certificates and how the certificate analysis component 160 and the suspect certificate list 152 can improve the use of security certificates. Among other components not shown, the security certificate environment 100 includes a client device 120, server 130, certificate authority (CA) 154, CT Log 150, the suspect certificate list 152, and the certificate analysis component 160, all connected by computer network 110. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Each of the components shown in FIG. 1 may be implemented via any type of computing device, such as computing device 600 described in connection to FIG. 6. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

The client device is on the client-side of environment 100, while the server 130 can be on the server-side of environment 100. Client device 120 may comprise any type of computing device capable of use by a user 105. By way of example and not limitation, a client device 120 may be embodied as a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Environment 100 includes network 110, which communicatively couples components of environment 100 including client device 120 (including its components 122, 124, 126), server 130 (including its components 132, 134, and 136), CT Log 150, certificate authority (CA) 154, the suspect certificate list 152, and the certificate analysis component 160.

The requesting application 122 is an application, such as a web browser, that uses certificates to authenticate parties. The client device 120 comprises requesting application 122, token authentication component 124, and certificate store 126.

The requesting application 122 requests authentication from the server 130. The token authentication component 124 authenticates an SSL certificate, which is one example of a security certificate usable with the technology described herein. The SSL certificate can validate the server in the eyes of the requesting application 122. The SSL certificate may be validated using Public Key Infrastructure (PKI) chain validation through a secondary authentication process. A step in the validation process can be validating that the provided SSL certificate is listed in a CT log.

As part of the PKI validation, a chain between a certificate trusted by the requesting application 122 and the SSL certificate is authenticated. The SSL certificate may not be directly trusted or known by the requesting application 122. Accordingly, a chain of certificates that includes a trusted certificate issued by a certificate authority (CA) can be used. In essence, the known certificate issued by the CA vouches for the authenticity of the other certificates in the chain. Aspects of the technology described herein can perform further validation on any certificate in the chain by analyzing the corresponding record for the certificate in the CT log. In an aspect, the certificates in the CT log are analyzed separately and associated with a trustworthiness score. The requesting application may access these scores as part of the validation process. If any certificate in the chain is designated as untrustworthy, then the connection to the server may be blocked. Other uses of the score are also possible. The scores may be stored in the suspect certificate list 152.

The certificate store 126 includes information that allows trusted certificates to be identified. In one aspect, the trusted certificates are issued by one or more CAs. These trusted certificates are used as part of the SSL certificate validation process.

The server 130 comprises a web service 132, an SSL (Secure Sockets Layer)/TLS (Transport Layer Security) component 134, and a certificate engine 136. The web service 132 provides a service to the requesting application 122. Access to the web service 132 may require authentication of the user 105 of the requesting application 122. The SSL/TLS component 134 establishes a secure connection with the client device 120. As part of this process, a security certificate is provided to the client by the certificate engine 136. The certificate may be stored on the server or requested from another device. The certificate engine may also provide evidence that the certificate has been entered in a CT log 150. For example, a signed certificate timestamp (SCT), which indicates the certificate has been entered in a CT log may be provided as an attachment to a certificate using an x.509v3 extension. In another example, a TLS extension can be used to deliver the SCT during validation.

The CT log 150 maintains a record of SSL certificates or other security certificates. The CT log 150 may maintain the log as append only. Certificate records can only be added, not modified or deleted, when the log is append only. The CT log 150 may be cryptographically assured, such as through the use of Merkle Tree Hashes. The CT log 150 is publically auditable, which means the records can be inspected. The CA 154 submits issued certificates to the CT log 150. The CT log 150 includes a record describing the certificate once added. The CT log 150 may then provide a SCT to the CA 154, server 130, or other party.

The certificate analysis component 160 is described in more detail with reference to FIG. 2. In brief, the certificate analysis component 160 accesses log entries in the CT log 150 and determines whether the individual certificate associated with an entry in the log is trustworthy. If it is determined to be untrustworthy, then it is added to the suspect certificate list 152. Additional or alternative actions could be taken upon determining a certificate is suspect.

Figure 2:
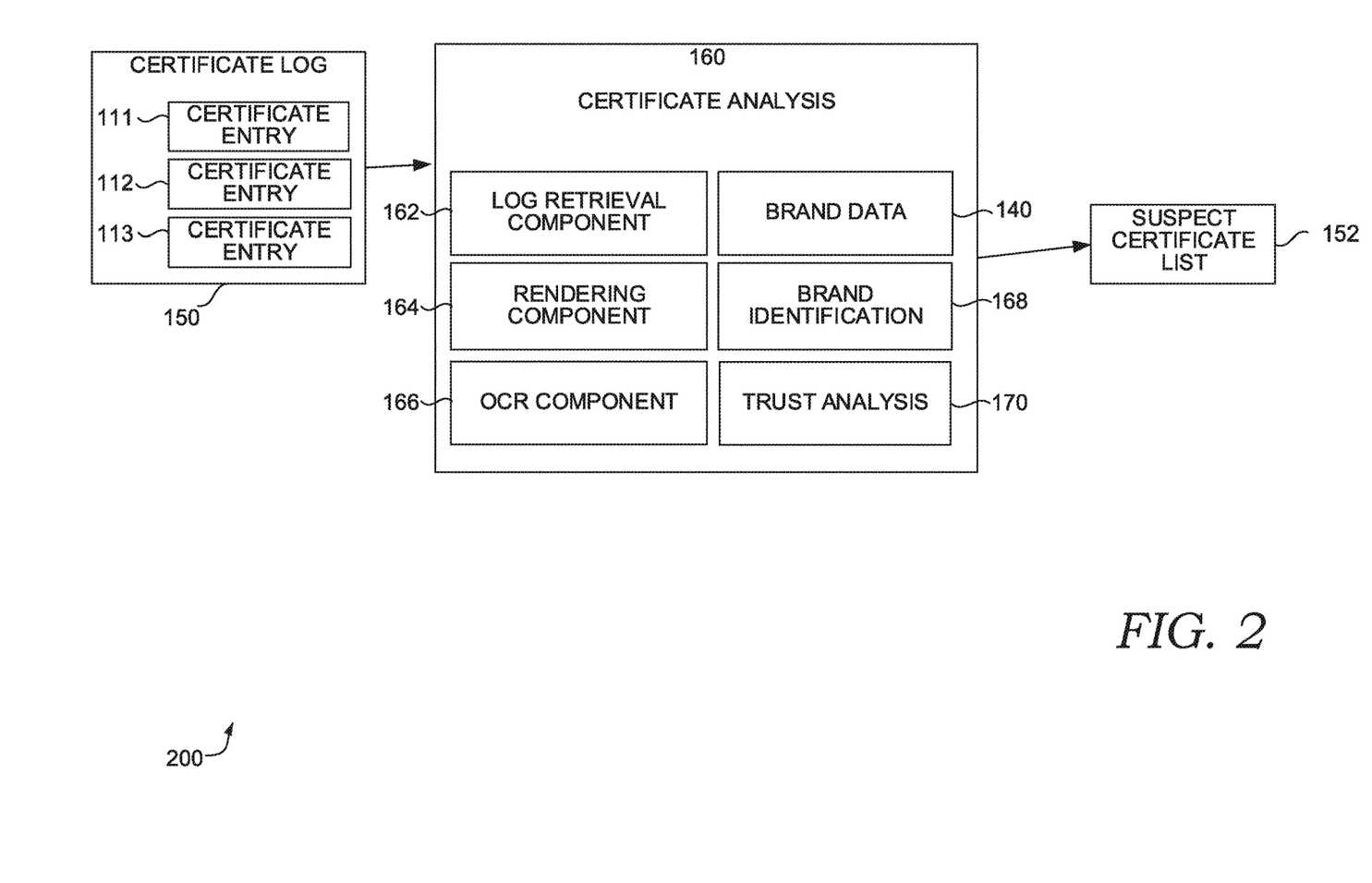
FIG. 2 is a block diagram of a security certificate analysis environment, in accordance with an aspect of the technology.

Turning now to FIG. 2, an exemplary certificate analysis environment 200 is shown, according to an aspect of the technology described herein. Environment 200 illustrates how the certificate analysis component 160 analyzes security certificates registered in the CT log 150. Among other components not shown, the certificate analysis environment 200 includes a CT log 150, the certificate analysis component 160 and the suspect certificate list 152, all connected by computer network (not shown), such as network 110. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Moreover, these components, functions performed by these components, or services carried out by these components may be implemented at appropriate abstraction layer (s), such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein regarding specific components shown in exemplary security certificate environment 100, it is contemplated that in some aspects functionality of these components can be shared or distributed across other components.

The CT log 150 comprises certificate entries for certificates submitted by a CA. The CT log 150 includes a first certificate entry 111, a second certificate entry 112, and a third certificate entry 113. In reality, a CT log may include a very large number of certificate entries, such as several million. The certificate log entry identifies the CA that issued the certificate. The certificate log entry also identifies a domain name associated with the certificate. The log entry may also include other information.

The certificate analysis component 160 includes a log retrieval component 162, a rendering component 164, an OCR component 166, a brand identification component 168, a trust analysis component 170, and brand data 140. The certificate analysis component 160 analyzes a certificate record and determines whether the certificate is trustworthy. A trustworthy certificate is a certificate that appears to be issued to a brand or entity associated with the domain name. An untrustworthy certificate is a certificate with a mismatch between the brand identified in the domain name and the entity to which the certificate issued. In other words, the untrustworthy certificate is issued to an entity that is not associated with the brand in the corresponding domain name.

The log retrieval component 162 retrieves data from the CT log. The retrieved data may require parsing in order to render a domain name. For example, a group of records may be stored in a data string within the CT log. The log retrieval component 162 may parse the data string to identify data associated with an individual certificate and then store this data in a schema suitable for use with the technology described herein, such as in a relational database or other structure that can be easily queried and analyzed.

The rendering component 164, renders a domain name from a CT record as it might appear in a web browser's address bar. This is achieved by rendering the domain name in a font and font size used by a browser. In one aspect, the rendering is repeated in all fonts and font sizes known to be used by web browsers. In this way, the rendering component 164 may generate dozens or hundreds of rendered images of a domain name for an individual certificate. Each of these renderings can then be analyzed. The rendered image may be stored as a data file for further processing and passed to the OCR component 166. The file may be associated with metadata that specifies the font and font size used to render the domain name in the image. The metadata may be used by the OCR component 166 to use an OCR model trained for the specific font or other characteristics listed in the metadata.

The OCR component 166, generates a text string from the rendered domain name using optical character recognition (OCR). In one aspect, the OCR system is trained using data rendered in all of the fonts in which the domain name is rendered. The font used to render the domain name may be passed to the OCR system when rendering so that an optimal character recognition may be performed. As described above, the font used may be captured in metadata associated with the file in which the rendered images are stored. The text string generated by the OCR component 166 should reflect how a person would read the rendered domain name.

As mentioned, the OCR component 166 can be trained using training data formatted in many different available fonts. The OCR system can take many forms, but the use of training data comprising labeled text or characters rendered in different fonts, is described in the context of a neural network. As used herein, a neural network comprises at least three operational layers. The three layers can include an input layer, a hidden layer, and an output layer. Each layer comprises neurons. The input layer neurons receive the images of the rendered domain name and pass data derived from the images to neurons in the hidden layer. Neurons in the hidden layer pass data to neurons in the output layer. The output layer then produces a character classification. Different types of layers and networks connect neurons in different ways.

Neurons have weights, an activation function that defines the output of the neuron given an input (including the weights), and an output. The weights are the adjustable parameters that cause a network to produce a correct output. For example, if the training image showed the letters n, t, p, z, then the correct output is to classify the image as showing the letters n, t, p, z. The weights are adjusted during training. Once trained, the weight associated with a given neuron can remain fixed. The other data passing between neurons can change in response to a given input (e.g., image). Retraining the network with an additional training image, for example letters rendered in different fonts, can update one or more weights in one or more neurons.

The neural network may include many more than three layers. Neural networks with more than one hidden layer may be called deep neural networks. Example neural networks that may be used with aspects of the technology described herein include, but are not limited to, multilayer perceptron (MLP) networks, convolutional neural networks (CNN), recursive neural networks, recurrent neural networks, and long short-term memory (LSTM) (which is a type of recursive neural network). The training implementation described subsequently uses a convolutional neural network, but aspects of the technology are applicable to other types of machine learning.

In each type of deep model, training is used to fit the model output to the training data. In particular, weights associated with each neuron in the model can be updated through training. Originally, the model can comprise random weight values that are adjusted during training. In one aspect, the model is trained using backpropagation. The backpropagation process comprises a forward pass, a loss function, a backward pass, and a weight update. This process is repeated for each training image. The goal is to update the weights of each neuron (or other model component) to cause the model to produce an output that maps to the correct label. The analogous training data comprises labeled analogous images. Each labeled image is input to the model and used to train it. Once a sufficient number of training images are fed to the model, then the training can stop. The OCR component can then be used to generate text strings from unlabeled images of rendered domain names.

In one aspect, OCR component 166 comprises a single model that can identify multiple text rendered in many different fonts. In another aspect, OCR component comprises multiple models with each model able to detect a single font (or perhaps multiple similar fonts). In the multiple model implementation, metadata associated with the image, which identifies a font, can be used to select the appropriate model. In the single model implementation, each rendered image is passed to the model. The end result of the OCR component's 166 operation is a text string of the domain name.

The brand identification component 168, analyzes the text string generated by the OCR system to determine whether the text string matches a brand name. As used herein, brand name is used broadly to be any proper noun, such as a person, place, or company. However, the brand data 140 may only include relatively well-known brand names since phishers are less likely to spoof comparatively unknown entities. The brand data 140 includes data used to identify brand names, domain practices for the brand name, and other information related to the brand name. The brand data 140 may include trademarks used by a brand, model names for products sold by a brand, authorized CAs for a brand, previously used CAs for a brand, and the like. The brand data can include acronym normalization data, for example, "I.B.M." could be normalized as IBM. The brand data could include common misspellings of brand names. The brand data can include model data, trademarks, and other terms closely associated with a brand. The brand data can be used to find a match with a domain name.

The brand identification component 168 can use natural language understanding to find a match between a text string and brand identification. In one aspect, the brand identification component 168 performs a dictionary extraction operation on the text string. The dictionary extraction can look for a sequence of tokens within the text string that match brand data, such as a brand name. Additionally or alternatively, complex pattern-based extraction may be performed.

In some aspects, the match does not need to be exact. The brand identification component 168 can perform approximate string matching (e.g., fuzzy string searching) that finds a match when a term in the brand data almost matches a term in the text string. For example, a term in the text string may be a match if the edit distance is less than a threshold or edit "cost." A word may have an edit distance of one if a single operation can transform the word in the text string to a word in the brand data. Example operations include insertion, deletion, substitution, and transposition (i.e., swapping the order of two characters). Different implementations of approximate matching are possible. For example, different operations may be given the same "cost" or different costs. The brand identification component 168 can specify when a match is found and whether the match is exact or approximate.

The trust analysis component 170 performs a trust analysis to determine whether the security certificate in the CT log is actually associated with the brand. The trust analysis can look at several factors including whether the CA issuing the certificate has previously issued certificates for the brand. If the CA issuing the certificate has not previously issued a certificate for the brand, then the certificate being evaluated may be designated as un-trustworthy. The trust analysis can also look at lists of CAs authorized by the brand to issue certificates. If the CA issuing the certificate is not on the list, then the certificate may be designated as untrustworthy.

The suspect certificate list 152 includes a list of certificates deemed untrustworthy by the certificate analysis component 160. This list may be accessible by browsers, servers, CAs, and other entities.

Figure 3:
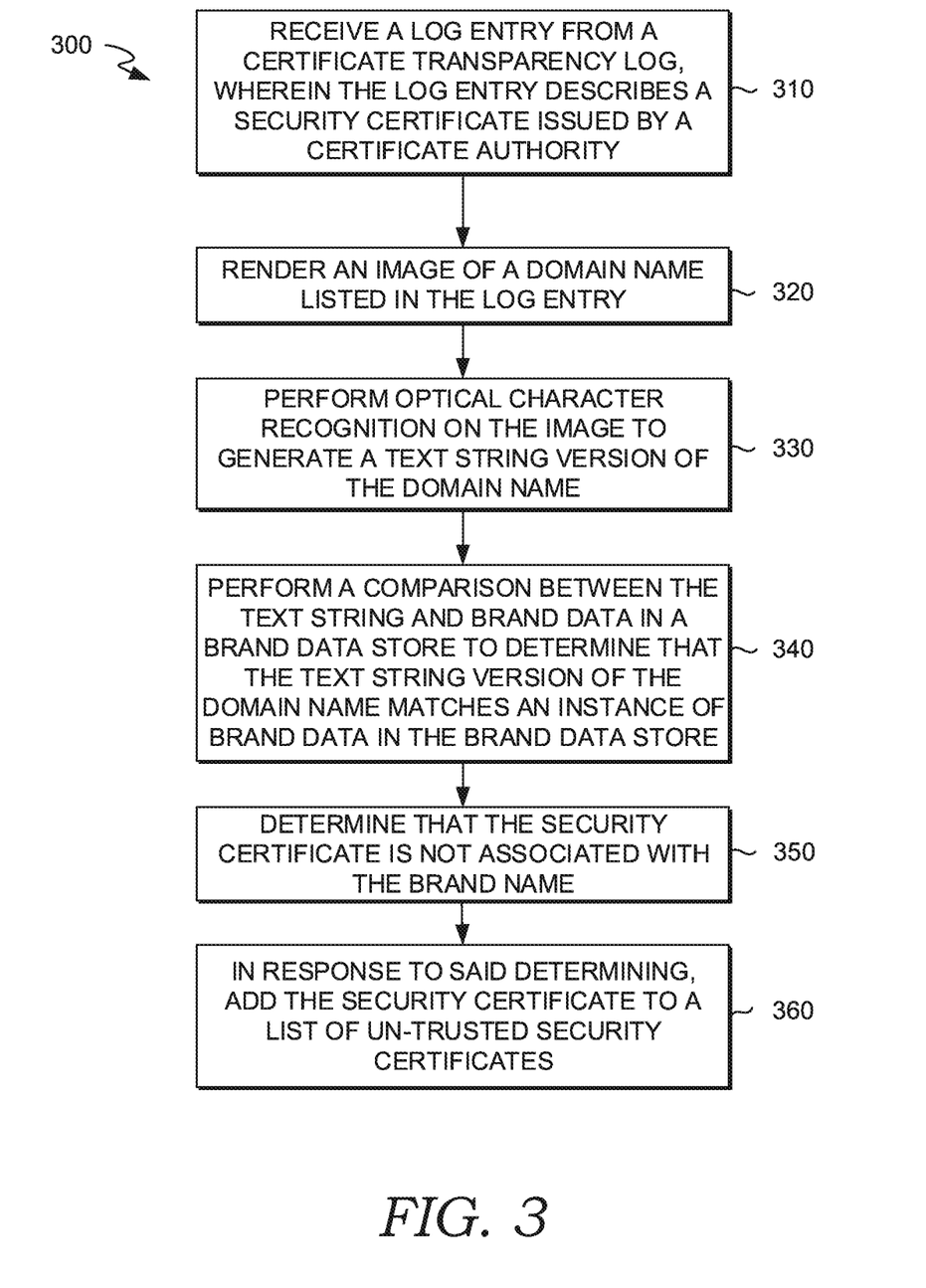
FIGS. 3-5 depict flow diagrams of methods for detecting an untrustworthy security certificate, in accordance with an aspect of the technology.

Turning now to FIG. 3, a method 300 for detecting an untrustworthy security certificate is provided. Method 300 may be performed by the certificate analysis component.

At step 310, a log entry from a certificate transparency (CT) log is received. The log entry describes a security certificate issued by a certificate authority. The retrieved data may require parsing in order to render a domain name. For example, a group of records may be stored in a data string within the CT log. The data string may be parsed to identify data associated with an individual certificate, and then this data may be stored in a schema suitable for use with the technology described herein, such as in a relational database or other structure that can be easily queried and analyzed.

The CT log maintains a record of SSL certificates or other security certificates. The CT log may maintain the log as append only. Certificate records can only be added, not modified or deleted, when the log is append only. The CT log may be cryptographically assured, such as through the use of Merkle Tree Hashes. The CT log is publically auditable, which means the records can be inspected. The CT log includes a record describing the certificate once added.

At step 320, an image of a domain name listed in the log entry is rendered. The domain name may be rendered as it would appear in a web browser's address bar. This may be achieved by rendering the domain name in a font and font size used by a browser. In one aspect, the rendering is repeated in all fonts and font sizes known to be used by web browsers. In this way, the dozens or hundreds of rendered images of a domain name may be generated for an individual certificate. Each of these renderings can then be analyzed. The rendered image may be stored as a data file for further processing. The file may be associated with metadata that specifies the font and font size used to render the domain name in the image.

At step 330, optical character recognition is performed on the image to generate a text string version of the domain name. As described previously, the OCR system used may be trained to recognize different font types. The metadata associated with a rendered name may be used in the optical character recognition process. For example, the font can be used to select an OCR model. This process may be repeated for each version of the domain name rendered.

At step 340, a comparison between the text string version and brand data in a brand name data store is performed to determine that the text string version of the domain name matches an instance of brand data in the brand name data store. In one aspect, a dictionary extraction operation is performed on the text string. The dictionary extraction can look for a sequence of tokens within the text string that match an instance of brand data, such as a brand name, associated domain name, model name, or other terms associated with a brand. Additionally or alternatively, complex pattern-based extraction may be performed.

In some aspects, the match does not need to be exact. Approximate string matching (e.g., fuzzy string searching) that finds a match when a term in the brand data almost matches a term in the text string can be used. For example, a term in the text string may be a match if the edit distance is less than a threshold or edit "cost." A word may have an edit distance of "one" if a single operation can transform the word in the text string to a word in the brand data. Example operations include insertion, deletion, substitution, and transposition (i.e., swapping the order of two characters).

Different implementations of approximate matching are possible. For example, different operations may be given the same "cost" or different costs.

At step 350, the security certificate is determined to not be associated with the brand name. This criteria can rely on different rules, as described previously with reference to performing a trust analysis. The trust analysis can look at several factors including whether the CA issuing the certificate has previously issued certificates for the brand. If the CA issuing the certificate has not previously issued a certificate for the brand, then the certificate being evaluated may be determined to not be associated with the brand, and therefore, designated as untrustworthy. The trust analysis can also look at lists of CAs authorized by the brand to issue certificates. If the CA issuing the certificate is not on the list, then the certificate being evaluated may be determined to not be associated with the brand, and therefore, may be designated as untrustworthy.

At step 360, in response to said determining, the security certificate is added to a list of un-trusted security certificates. The list may be accessible by browsers or other applications that rely on security certificates and used to block access to a server, generate a warning, or take other action. In one aspect, an entity is informed that a certificate including their brand data has been issued. The communication may direct the entity to the CT log including the new certificate.

Figure 4:
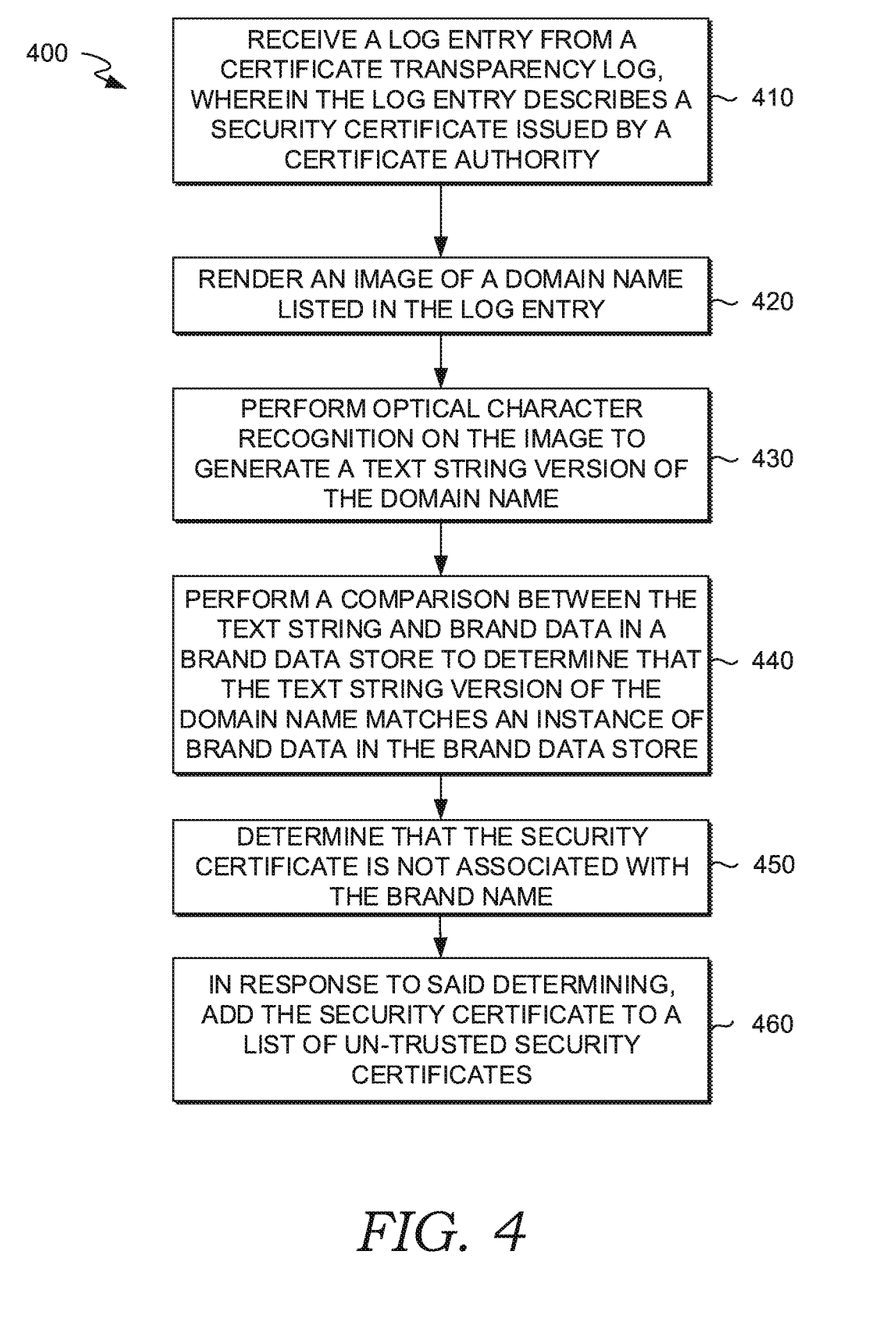

Turning now to FIG. 4, a method 400 for detecting an untrustworthy security certificate is provided.

At step 410, a log entry from a certificate transparency log is received. The log entry describes a security certificate issued by a certificate authority.

At step 420, an image of a domain name listed in the log entry is rendered. The domain name may be rendered as it would appear in a web browser's address bar. This may be achieved by rendering the domain name in a font and font size used by a browser. In one aspect, the rendering is repeated in all fonts and font sizes known to be used by web browsers. In this way, the dozens or hundreds of rendered images of a domain name may be generated for an individual certificate. Each of these renderings can then be analyzed. The rendered image may be stored as a data file for further processing. The file may be associated with metadata that specifies the font and font size used to render the domain name in the image.

At step 430, optical character recognition is performed on the image to generate a text string version of the domain name. As described previously, the OCR system used may be trained to recognize different font types. The metadata associated with a rendered name may be used in the optical character recognition process. For example, the font can be used to select an OCR model. This process may be repeated for each version of the domain name rendered.

At step 440, a comparison between the text string version and brand data in a brand name data store is performed to determine that the text string version of the domain name matches an instance of brand data in the brand name data store. In one aspect, a dictionary extraction operation is performed on the text string. The dictionary extraction can look for a sequence of tokens within the text string that match an instance of brand data, such as a brand name, associated domain name, model name, or other terms associated with a brand. Additionally or alternatively, complex pattern-based extraction may be performed.

In some aspects, the match does not need to be exact. Approximate string matching (e.g., fuzzy string searching) that finds a match when a term in the brand data almost matches a term in the text string can be used. For example, a term in the text string may be a match if the edit distance is less than a threshold or edit "cost." A word may have an edit distance of "one" if a single operation can transform the word in the text string to a word in the brand data. Example operations include insertion, deletion, substitution, and transposition (i.e., swapping the order of two characters). Different implementations of approximate matching are possible. For example, different operations may be given the same "cost" or different costs.

At step 450, the certificate authority that issued the security certificate is determined to not have issued other security certificates linked to the brand name. Brand data for the brand name can include certificate authorities that have issued trusted certificates to the entity associated with the brand name. Typically, entities use the same CAs to issue certificates. The use of a new CA can signal that a spoofing may be occurring.

At step 460, in response to said determining, the security certificate is added to a list of un-trusted security certificates. The list may be accessible by browsers or other applications that rely on security certificates and used to block access to a server, generate a warning, or take other action. In one aspect, an entity is informed that a certificate including their brand data has been issued. The communication may direct the entity to the CT log including the new certificate.

Figure 5:
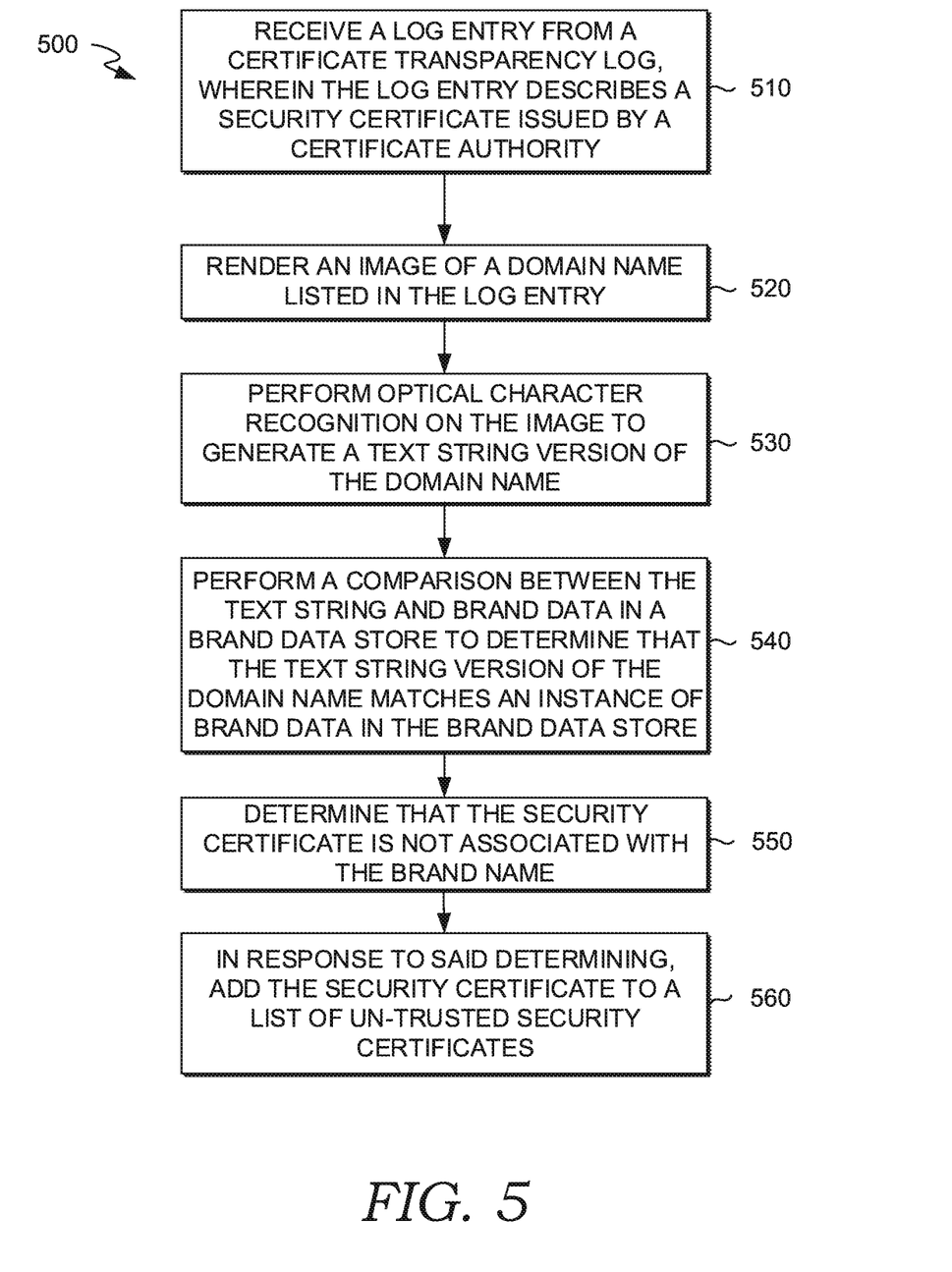

Turning now to FIG. 5, a method 500 for detecting an untrustworthy security certificate is provided.

At step 510, a log entry from a certificate transparency log is received. The log entry describes a security certificate issued by a certificate authority.

At step 520, an image of a domain name listed in the log entry is rendered as the domain name would appear in a web browser's address bar. This may be achieved by rendering the domain name in a font and font size used by a browser. In one aspect, the rendering is repeated in all fonts and font sizes known to be used by web browsers. In this way, the dozens or hundreds of rendered images of a domain name may be generated for an individual certificate. Each of these renderings can then be analyzed. The rendered image may be stored as a data file for further processing. The file may be associated with metadata that specifies the font and font size used to render the domain name in the image.

At step 530, optical character recognition is performed on the image to generate a text string version of the domain name. As described previously, the OCR system used may be trained to recognize different font types. The metadata associated with a rendered name may be used in the optical character recognition process. For example, the font can be used to select an OCR model. This process may be repeated for each version of the domain name rendered.

At step 540, a comparison between the text string version and brand data in a brand name data store is performed to determine that the text string version of the domain name matches an instance of brand data in the brand name data store. In one aspect, a dictionary extraction operation is performed on the text string. The dictionary extraction can look for a sequence of tokens within the text string that match an instance of brand data, such as a brand name, associated domain name, model name, or other terms associated with a brand. Additionally or alternatively, complex pattern-based extraction may be performed.

In some aspects, the match does not need to be exact. Approximate string matching (e.g., fuzzy string searching) that finds a match when a term in the brand data almost matches a term in the text string can be used. For example, a term in the text string may be a match if the edit distance is less than a threshold or edit "cost." A word may have an edit distance of "one" if a single operation can transform the word in the text string to a word in the brand data. Example operations include insertion, deletion, substitution, and transposition (i.e., swapping the order of two characters). Different implementations of approximate matching are possible. For example, different operations may be given the same "cost" or different costs.

At step 550, the security certificate is determined to not be associated with the brand name. This criteria can rely on different rules, as described previously with reference to performing a trust analysis. The trust analysis can look at several factors including whether the CA issuing the certificate has previously issued certificates for the brand. If the CA issuing the certificate has not previously issued a certificate for the brand, then the certificate being evaluated may be determined to not be associated with the brand, and therefore, designated as untrustworthy. The trust analysis can also look at lists of CAs authorized by the brand to issue certificates. If the CA issuing the certificate is not on the list, then the certificate being evaluated may be determined to not be associated with the brand, and therefore, may be designated as untrustworthy.

At step 560, in response to said determining, the security certificate is added to a list of un-trusted security certificates. The list may be accessible by browsers or other applications that rely on security certificates and used to block access to a server, generate a warning, or take other action. In one aspect, an entity is informed that a certificate including their brand data has been issued. The communication may direct the entity to the CT log including the new certificate.

Figure 6:
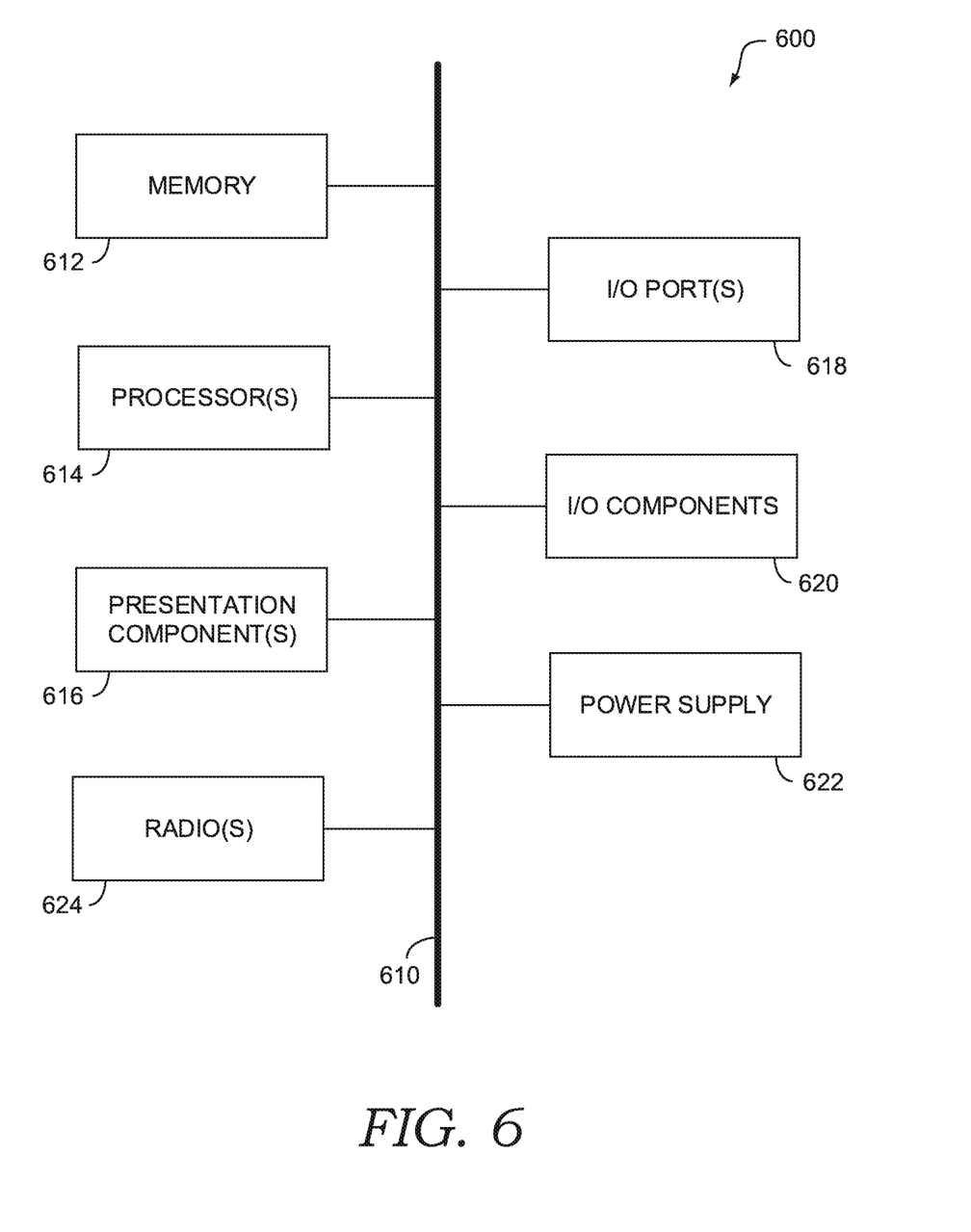
FIG. 6 is a block diagram of an exemplary computing environment suitable for use in implementing an aspect of the technology.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more aspects of the present technology. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer-storage media and communication media.

Computer-storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc.

The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some aspects of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method for detecting an untrustworthy security certificate, comprising:
   receiving a log entry from a certificate transparency log, wherein the log entry describes a security certificate associated with a certificate authority;
   rendering a domain name listed in the log entry in a font to generate an image of the domain name, wherein the font is associated with a browser address bar;
   providing an input to an optical character recognition model comprising the image of the domain name and an identification of the font;
   generating, by the optical character recognition model, a text string version of the domain name from the input;
   determining that the text string version of the domain name matches an instance of brand data in the brand data store by performing a comparison between the text string version and brand data in a brand data store;
   determining that the security certificate is not associated with the brand name by determining that the certificate authority associated with the security certificate is different than a second certificate authority associated with other certificates associated with the brand name; and
   in response to said determining, adding the security certificate to a list of un-trusted security certificates.

2. The method of claim 1, wherein a system performing the optical character recognition is trained to recognize text rendered in the font.

3. The method of claim 1, wherein the image of the domain name is rendered to have an appearance consistent with how a web browser would render the domain name in an address bar.

4. The method of claim 1, wherein the text string version of the domain name matches the brand name when the brand name and the text string version of the domain name are within a threshold edit distance.

5. The method of claim 1, further comprising communicating a notification to a company associated with the brand name describing the security certificate.

6. The method of claim 1, further comprising determining the certificate authority is not explicitly listed in a certificate authority authorization record for a domain associated with the brand name.

7. The method of claim 1, wherein determining that the security certificate is not associated with the brand name comprises determining that the certificate authority associated with the security certificate has not issued other security certificates linked to the brand name.

8. A method for detecting an untrustworthy security certificate, comprising:
   receiving a log entry from a certificate transparency log, wherein the log entry describes a security certificate associated with a certificate authority;
   rendering an image of a domain name listed in the log entry in a font;
   providing an input to an optical character recognition model comprising the image and an identification of the font;
   generating, using the optical character recognition model, a text string version of the domain name from the input
   determining that the text string version of the domain name matches an instance of brand data in the brand data store by performing a comparison between the text string version and brand data in a brand data store;
   determining that the certificate authority associated with the security certificate is not associated with other security certificates linked to the brand name; and
   in response to said determining, adding the security certificate to a list of un-trusted security certificates.

9. The method of claim 8, wherein font is used by a web browser.

10. The method of claim 9, wherein a system performing the optical character recognition is trained to recognize text rendered in the font.

11. The method of claim 8, wherein the image of the domain name is rendered to have an appearance consistent with how a web browser would render the domain name in an address bar.

12. The method of claim 8, wherein the text string version of the domain name matches the brand name when the brand name and the text string version of the domain name are within a threshold edit distance.

13. The method of claim 8, further comprising determining the certificate authority is not explicitly listed in a certificate authority authorization record for a domain associated with the brand name.

14. The method of claim 8, further comprising communicating the list to a web browser for use generating user warnings when the user attempts to navigate to a web page associated with the security certificate.

15. The method of claim 8, further comprising communicating a notification to a company associated with the brand name describing the security certificate.

16. One or more computer storage media that, when executed by a computing device, causes the computing device to perform a method detecting an untrustworthy security certificate, the method comprising:
   receiving a log entry from a certificate transparency log, wherein the log entry describes a security certificate associated with a certificate authority;
   rendering an image of a domain name listed in the log entry in a font used within a web browser's address bar;
   generating a text string version of the domain name by performing, using a machine learning model, optical character recognition on the image, wherein the machine learning model is trained to recognize text rendered in the font;

determining that the text string version of the domain name matches an instance of brand data in the brand data store by performing a comparison between the text string version and brand data in a brand data store;

determining that the security certificate is not associated with the brand name; and in response to said determining, adding the security certificate to a list of un-trusted security certificates.

17. The media of claim 16, further comprising:

communicating the list to a web browser for use generating user warnings when the user attempts to navigate to a web page associated with the security certificate.

18. The media of claim 16, wherein said determining that the security certificate is not associated with the brand name comprises determining that the certificate authority is not listed in a certificate authority authorization record for a domain associated with the brand name.

19. The media of claim 16, wherein determining that the security certificate is not associated with the brand name comprises determining that the certificate authority associated with the security certificate has not issued other security certificates linked to the brand name.

20. The media of claim 16, wherein the image of the domain name is rendered in a font used by a web browser and a system performing the optical character recognition is trained to recognize text rendered in the font.

\* \* \* \* \*